C. H. WARRINGTON.
Land-Marker.
No. 210,278. Patented Nov. 26, 1878.
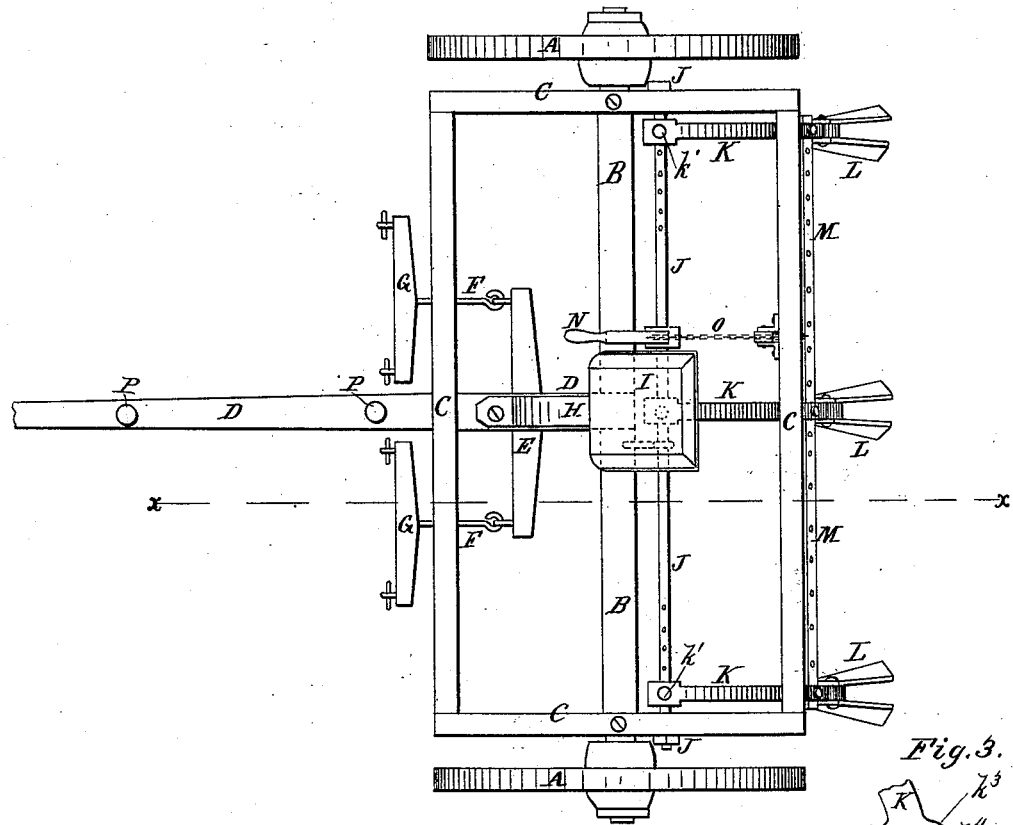
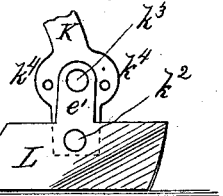
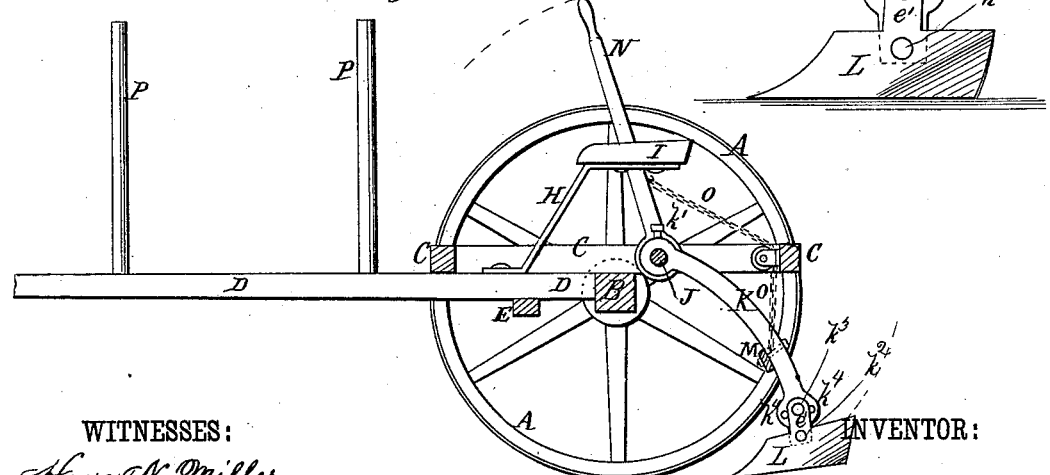
WITNESSES:
Henry N. Miller
C. Sedgwick
INVENTOR:
C. H. Warrington
BY
Munn & Co
ATTORNEYS.

UNITED STATES PATENT OFFICE.

CURTIS H. WARRINGTON, OF WEST CHESTER, PENNSYLVANIA.

IMPROVEMENT IN LAND-MARKERS.

Specification forming part of Letters Patent No. 210,278, dated November 26, 1878; application filed October 2, 1878.

*To all whom it may concern:*

Be it known that I, CURTIS HOOPES WARRINGTON, of West Chester, in the county of Chester and State of Pennsylvania, have invented a new and useful Improvement in Land-Markers, of which the following is a specification:

Figure 1 is a top view of my improved machine. Fig. 2 is a vertical section of the same, taken through the line $x\ x$, Fig. 1. Fig. 3 is a detail side view of one of the plows enlarged.

Similar letters of reference indicate corresponding parts.

The object of this invention is to furnish an improved machine for marking land, which shall be so constructed that it may be readily adjusted to make the marks at any desired distance apart, which will allow the plows to be readily raised from the ground for convenience in turning around and in passing from place to place, which may be readily guided in a straight line and adjusted to work at any desired depth in the ground, and which may also be used as a cultivator and as a harrow when desired.

The invention will first be described in connection with the drawings, and then pointed out in the claim.

A represents the wheels, which revolve upon the journals of the axle B. To the axle B, near its ends, is attached a rectangular frame, C, which is formed of two side bars, connected at their ends by two cross-bars. To the center of the axle B, and of the forward cross-bar of the frame C, is rigidly attached the tongue D. To the lower side of the tongue D, a little in the rear of the forward cross-bar of the frame C, is pivoted the double-tree E. To the ends of the double-tree E are pivoted the rear ends of two rods, F, which pass through keepers attached to the lower side of the forward cross-bar of the frame C, and to their forward ends are attached the single-trees G. To the tongue D, in the rear of the forward cross-bar of the frame C, is attached the lower end of the standard H, to the upper end of which the driver's seat I is attached. The standard H inclines to the rearward, so that the driver's seat I may be directly over the center of the axle B.

J is a long rod, which has a head upon one end and a screw-thread upon the other, and which is passed through and fits loosely in holes formed in the side bars of the frame C, a little in the rear of the axle B, and is secured in place by a nut screwed upon its forward end. The rod J passes through holes in the upper ends of the arms K, three, more or less, of which may be used, and which are secured in place by set-screws $k^1$ passing through them and pressing against the said rod J. Indentations or recesses are formed in the side of the rod J, about six inches apart, to receive the points of the set-screws $k^1$, so that the arms K may be adjusted at any desired distance apart. The arms K are curved to bring their lower ends into proper position to receive the plows L.

The plows L are made with a mold-board upon each side, and with two parallel upwardly-projecting lugs, $e'$, upon their tops, to receive the lower ends of the arms or standards K, where they are secured in place by two bolts, $k^2\ k^3$. The lower bolts, $k^2$, pass through the lower ends of the arms K and the lower parts of the lugs $e'$. The upper bolts, $k^3$, pass through the upper parts of the lugs $e'$ and through the arms K, or through projections $k^4$, formed upon the front and rear sides of the said arms K. The holes in the arms K and the projections $k^4$ for the upper bolts, $k^3$, are made in the arc of a circle having its center in the hole for the lower bolt, $k^2$, so that the pitch of the plows can be adjusted by adjusting the said upper bolts, $k^3$. The lower ends of the arms or standards K are kept at the proper distance apart by a bar, M, to which they are bolted. The bar M has a number of holes, about six inches apart, formed through it to receive the fastening-bolts, so that the lower ends of the arms K may be adjusted to correspond with the adjustment of their upper ends. The bar M may be bolted to the arms K, as shown in the drawings; but I prefer to pass it through keepers attached to the said arms, where it is secured in place by bolts passed through it and through slots in the said keepers and arms, so that the plows can adjust themselves to uneven ground while being held in their proper relative positions. To the rod J, near the driver's seat I, is attached the lower end of a lever, N, the upper end of which projects into such a position that it can be conveniently reached and operated by the driver from his seat. To the lever N is attached the end of a cord or chain, O, which passes over the rear cross-bar of the frame C, or around a pulley pivoted to the said cross-bar, so that the plows can be readily raised from the ground by operating the said lever N. To the tongue D are attached two rods or standards, P, of such a length that their upper ends may be about upon a level with the driver's head, so that the driver, by keeping the standards P in line with a stake or other object at the side of the field toward which he is going, may guide his machine in a straight line.

Any desired number of arms K and plows L may be attached to the rod J and the bar M, as the particular work to be done may require.

Having thus described my invention, I am aware that it is not new in a furrower to combine the elements so that the plows can be regulated by adjusting the driver's seat; also, that a gang-plow has been used in which the beams are pivoted to hangers from the axle; also, that plow-standards have been pivoted to drag-bars that connect with the front of frame.

What I claim as new and of my invention is—

A land-marker consisting of a two-wheeled vehicle, a rod, J, pivoted in its frame, C, standards K, made fast to said rod and carrying plows, and a spacing-bar, M, said standards being adjustable on rod J and bar M, as shown and described.

CURTIS HOOPES WARRINGTON.

Witnesses:
T. FRANCIS WARRINGTON,
WILLIAM BURNS.